United States Patent [19]
Kaiser

[11] 3,928,796
[45] Dec. 23, 1975

[54] CAPACITIVE DISPLACEMENT TRANSDUCER

[75] Inventor: Willard D. Kaiser, Grove City, Ohio

[73] Assignee: International Lead Zinc Research Organization, Inc., New York, N.Y.

[22] Filed: Nov. 30, 1973

[21] Appl. No.: 420,556

[52] U.S. Cl............ 324/61 R; 317/249 R; 317/251; 318/662; 323/93
[51] Int. Cl.$^2$......................................... G01R 27/26
[58] Field of Search....... 324/61 R; 317/251, 249 R; 323/93

[56] References Cited
UNITED STATES PATENTS

| | | | |
|---|---|---|---|
| 2,824,281 | 2/1958 | Radnor | 324/61 R |
| 3,566,221 | 2/1971 | Sargent | 323/93 X |
| 3,596,592 | 8/1971 | Trissnak et al. | 324/61 X |
| 3,702,957 | 11/1972 | Wolfendale | 323/93 X |
| 3,784,897 | 1/1974 | Norrie | 323/93 |

OTHER PUBLICATIONS
Lion, Instrumentation in Scientific Research, McGraw-Hill, N.Y., 1959, pp. 66–72.

*Primary Examiner*—Stanley T. Krawczewicz
*Attorney, Agent, or Firm*—Brumbaugh, Graves, Donohue & Raymond

[57] ABSTRACT

A simple rugged capacitive displacement transducer for use in dirty and severe shock environments has a conductive sleeve that is preferably lined on the inside and outside with an insulating material. The sleeve slides over the free end of a rod whose displacement is to be measured and as the rod moves within the sleeve, the capacitance between the sleeve and rod is changed. The change in capacitance is converted by an electronic circuit into a current signal representing the displacement of the rod. If the rod does not have a free end, the conductive portion of the sleeve is made in the form of two opposing triangular areas and a cylindrical ground plate disk is attached to the rod in the region of the conductive portion of the sleeve.

1 Claim, 2 Drawing Figures

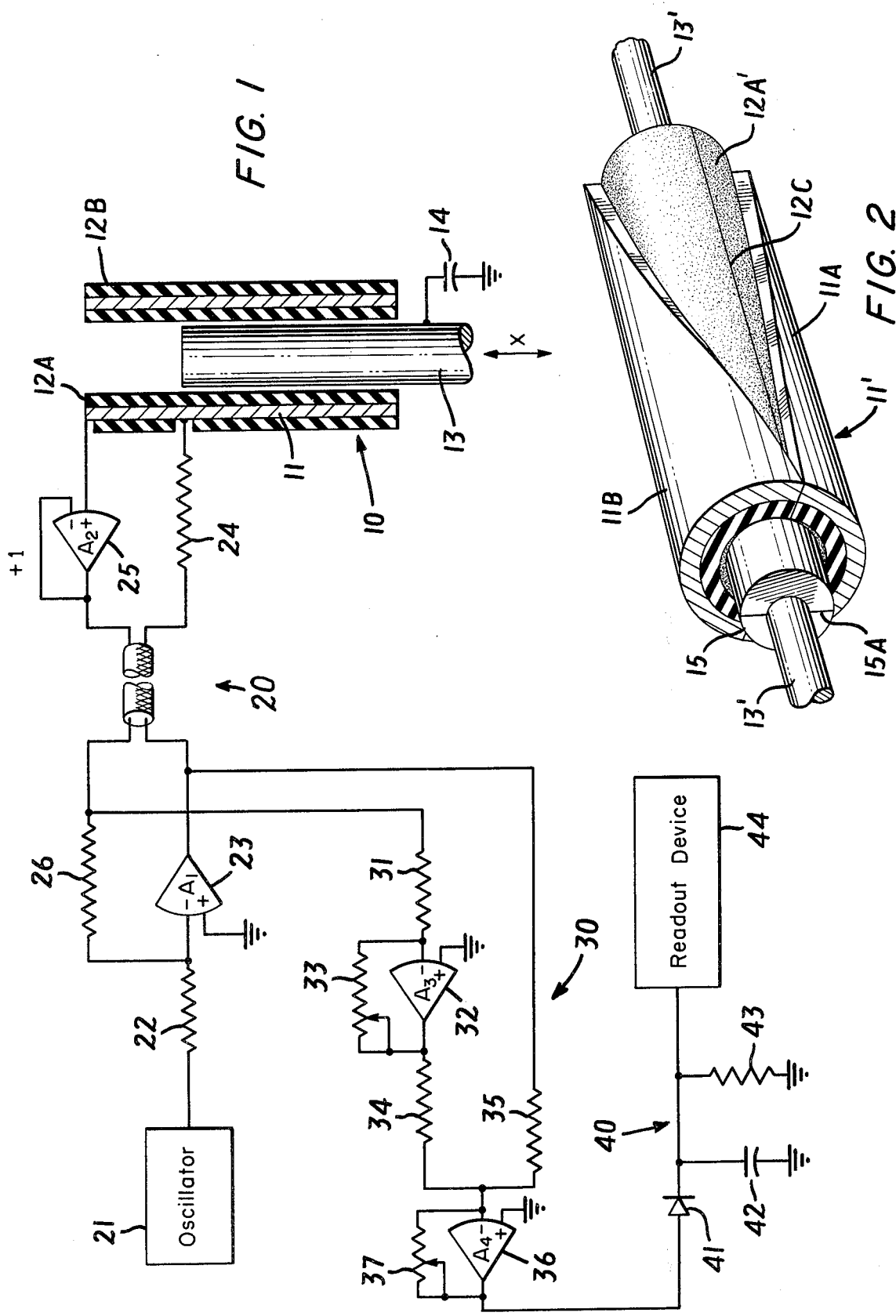

CAPACITIVE DISPLACEMENT TRANSDUCER

BACKGROUND OF THE INVENTION

This invention relates to displacement transducers and, more particularly, to capacitive transducers that can be used in dirty and severe shock environments.

Some of the devices which are presently used for displacement and/or velocity measurement in systems with long strokes, include linear potentiometers, cable-driven rotary potentiometers, linear and rotary differential transformers, and linear and rotary pulse generating systems. However, these devices are usually expensive and/or are not rugged enough for use in dirty, severe shock and vibration environments, such as those found near the tail rod of a shot system on a die casting machine or the piston rod of other hydraulic systems.

Like these other devices, capacitive transducers can also be used to measure the displacement of parts of a machine. The capacitive transducer functions by having the plates of the transducer attached to the parts whose relative displacement is to be measured. Then, the change in the capacitance of the transducer as the distance between its plates is changed through motion of the machine parts, is measured. The measurement of the change in capacitance can be made either by noting the change in an a.c. signal after it is applied to a bridge circuit of which the transducer is a part, as is disclosed in U.S. Pat. No. 3,596,592, or by detecting the change in frequency or voltage of an oscillator circuit of which the transducer is a part, as is shown in U.S. Pat. Nos. 3,566,221 and 3,701,009. Other circuits measure the capacitance by noting the change in output current of a crystal oscillator as it is detuned by the transducer or measure the voltage induced in one electrode as it moves between two other differently charged electrodes, as shown in U.S. Pat. Nos. 2,510,822 and 3,566,222. Many of these capacitive transducers are relatively expensive, delicate or complicated, like the ones disclosed in U.S. Pat. No. 3,566,222, which uses sapphire balls to position the electrodes, and U.S. Pat. No. 3,566,221, which uses quartz (glass) electrodes. There are relatively simple capacitive transducers available, such as the one in U.S. Pat. No. 3,596,592. However, these transducers require modification of the machine part being measured and will only work on a part which has a free end to allow attachment of the center rod of the transducer.

Therefore, it would be useful to have a displacement transducer which is inexpensive, rugged, simple and adaptable for use on a variety of machines without interfering with the operation of the machines or their structures.

SUMMARY OF THE INVENTION

The present invention is directed to decreasing the cost and increasing the reliability of transducers used in rugged environments to measure the relatively long strokes of a machine having a moving rod. This object is achieved by allowing the the moving rod of the machine itself to act as one plate of a capacitive transducer and a conductive sleeve surrounding the rod to act as the other plate. Then the a.c. current through the transducer is measured while the potential across it is kept constant.

In an illustrative embodiment of the invention the transducer is merely a conductive sleeve which can be slipped over the free end of the moving rod of the machine. Insulating can be provided inside and/or outside of the sleeve to protect it from dirt in the vicinity of the machine or from contact with the rod. The rod, whose motion is to be measured, is a.c. grounded through a large capacitor or a wire, or through the capacitance or contacts normally present in most cylinders and machines. Motion of the rod within the sleeve will change the capacitance between the rod and sleeve as a function of the rod's displacement. The change in capacitance with displacement is then measured by an electronic circuit that maintains a constant a.c. potential on the conductive sleeve with a feed-back loop. The change in current supplied to the sleeve in order to maintain the a.c. potential as the capacitance is changed is a direct measure of the displacement of the rod. This a.c. current is detected by measuring the voltage across a resistor in series with the transducer sleeve after it has been rectified and filtered.

If the moving rod of the machine does not have a free end to move in and out of the sleeve, the sleeve can be modified so that it is conductive only in two connected opposing triangular areas. A disk is fixed on the rod in the region of the triangular conducting planes so that the motion of the disk with respect to the triangular areas will produce a change in capacitance with displacement. This capacitance change for a closed-end rod can be measured in the same manner as the capacitance change of an open-ended rod.

BRIEF DESCRIPTION OF THE DRAWINGS

The foregoing and other features of the present invention will be more readily apparent from the following detailed description and drawings in which:

FIG. 1 is an illustrative embodiment of the invention for measuring the displacement of a rod having a free-end; and FIG. 2 is a perspective view of a transducer for measuring the displacement of a rod without a free-end, according to the principals of the present invention.

DESCRIPTION OF EXEMPLARY EMBODIMENTS

FIG. 1 shows a simple rugged transducer 10 and the circuit for converting the transducer output into a voltage signal, which is a function of the displacement of the movable rod 13. The transducer 10 principally consists of a cylindrical conducting sleeve 11, that is protected on its inner surface by an insulator 12A and on its outer surface by an insulator 12B. The insulators 12A and 12B protect the conductor against dirt and also against electrical grounding by the moving 13, which is a.c. grounded through the large capacitance capacitor 14. The rod 13 can be part of any mechanism where the displacement and/or velocity of the rod needs to be measured. For instance, the rod 13 could be the tail rod of the shot system of a die casting machine or the piston rod of some other hydraulic system.

The conducting sleeve 11 and the moving rod 13 form a capacitive transducer whose capacitance is a function of the motion of the rod 13. In effect, the sleeve and rod act like the plates of a capacitor where they overlap, and as the rod slides into the sleeve the area of the plates increases, thereby increasing the capacitance. In order to measure the capacitance a circuit 20 supplies a constant a.c. voltage to the sleeve. As the capacitance of the transducer 10 increases more current is passed through the transducer and capacitor 14 to ground. This change in current shows up as a voltage change across a resistor 24, which is measured by circuit 30. The output of the circuit 30 is rectified and filtered in a circuit 40 and the resulting d.c. voltage is measured in a readout device 44. The readout device 44 can be a simple voltmeter recorder, or other voltage trandsucer, calibrated in distance when distance is to be measured, or, if velocity is to be measured, a simple differentiation circuit can be added to the circuit to produce a voltage proportional to velocity.

The circuit 20 for applying a constant voltage to the sleeve 11 uses a high frequency constant voltage oscillator 21. The output of the oscillator 21 is applied to the inverting input of an amplifier 23 through a resistor 22. In turn the output of the amplifier 23 is applied to the sleeve 11 through current sensing resistor 24. To assure that the voltage on the sleeve is kept constant, a feedback path is provided to the inverting input of the amplifier 23 through a unity-gain, non-inverting amplifier 25 and resistor 26. Naturally, when the power and impedence matching requirements are low, such as when the circuit is mounted on the sleeve, the amplifier 25 can be dispensed with. In the circuit 20 the feedback resistor 26 senses the voltage on the sleeve and varies the output of the amplifier 23 to maintain a constant a.c. voltage on the sleeve 11.

With a constant a.c. voltage applied to the sleeve 11, the current through the transducer to grounding capacitor 14 is $$i = wc \cos wt$$

where $i$ is current, $w$ is the radian frequency of the oscillator 21 and $c$ is the capacitance of the transducer. If the amplifier 25 is used or resistors 26 and 31 are much greater than the capacitive impedence of the sleeve, the current through the resistor 24 will be approximately the same as the current through the transducer 10. Since the capacitance of the transducer is directly proportional to the length of the rod in the sleeve, the current through the tranducer is proportional to the capacitance of the transducer, and the current through the resistor 24 will be proportional to the current through the transducer, the voltage drop across the resistor 24 will be proportional to the length of the rod inside the sleeve.

The voltage across the resistor 24 is measured by the circuit 30. This is accomplished by applying the voltage at one end of resistor 24, to the inverting input of amplifier 36 through resistor 35. The voltage at the other end of resistor 24 is applied to the inverting input of amplifier 36 through the amplifier 25 and 32, and the resistors 31 and 34. The amplifier 32 inverts the voltage with a gain depending on the ratio of resistors 33 and 31. Therefore, the voltage at the inverting input of the amplifier 36 represents the difference between the voltages of each end of resistor 24, i.e., the voltage across the resistor 24. The voltage ouput of the amplifier 36 is then demodulated by a diode 41 and a capacitor 42 of the circuit 40. A resistor 43 is provided across capacitor 42 and a readout device 44, such as a voltmeter, is connected across the resistor 43. The voltage measured by the readout device 44 is a direct measure of the displacement of the rod 13. If a velocity readout is desired, the demodulated signal can be differentiated with conventional circuits, or the slope of the voltage versus time curve can be measured on an oscilloscope or oscillograph.

If resistors 22 and 26 are equal, then the phase and magnitude of the voltages on the amplifier 32 and at the output of the oscillator will be equal. In such a case the output of the oscillator can be supplied to the resistor 34 and amplifier 32 can be eliminated.

FIG. 1 shows that the change in capacitance of the transducers depends on how much of the free end of the constant diameter movable rod 13 extends into the sleeve 13. Obviously this type of transducer will not work where the rod has no free end, such as where both ends of the rods are connected to parts of the machine or where the diameter is not uniform. To overcome these problems the transducer must be modified as shown in FIG. 2. In FIG. 2 parts which are similar to those shown in FIG. 1 have the same reference number, but are marked with a prime. The conductors 11' of FIG. 2 is in the form of two opposing triangular sections, 11A and 11B, rather than the cylindrical conductive sleeve shown in FIG. 1. The triangular sections are mounted on an insulator 12A' and the whole unit may be separated along line 12C so that the sleeve may be fitted around a closedend rod 13' of an existing machine without disassembling it. To compensate for a variable diameter of the rod 13', the diameter of the sleeve is made much larger than the rod and a disk 15 is attached to the rod by joining it along the line 15A. The disk 15 may be electrically connected to the rod 13' or it may be insulated from the rod. If the disk is insulated from the rod the disk must be coupled to ground through some means.

As the rod is moved, the disk 15 moves in the region between the two triangular conductive areas. As a result, the capacitance between the disk and the conductors, 11A and 11B changes, since the area of the conductive triangles adjacent the disk decreases as the disk moves to the right in FIG. 2. Also, the two triangular sections create capacitance areas that are 180° apart, thereby minimizing the effects of misalignment between the rod and the sleeve. The electronic circuits of FIG. 1 can be used to convert the change in capacitance into an d.c. voltage signal suitable for the pickup device 44.

While the invention has been particularly shown and described with reference to preferred embodiments thereof, it will be understood by those skilled in the art that various changes in form and details may be made therein without departing from the spirit and scope of the invention.

I claim:

1. Apparatus for measuring the displacement of a moveable rod of a machine, comprising:
   a conductive sleeve located over at least a part of the rod;
   a resistance having one end connected to said conductive sleeve;
   an operational amplifier with its output connected to the other end of said resistance and its noninverting input connected to a reference ground;
   an input resistor with one end connected to the inverting input of said amplifier;
   a source of a.c. voltage connected to the other end of said input resistor;
   a feedback resistor with one end connected to the inverting input of said amplifier;
   means for connecting said conductive sleeve to the other end of said feedback resistor;
   means for coupling said rod to the reference ground;
   means for obtaining an a.c. signal equal to the a.c. voltage drop across said resistance;
   means for demodulating the a.c. signal; and
   means for measuring the demodulated signal.

* * * * *